(12) United States Patent
Deshpande

(10) Patent No.: US 11,244,354 B2
(45) Date of Patent: Feb. 8, 2022

(54) SYSTEM AND METHODS FOR PROVIDING RECOMMENDATIONS

(71) Applicant: InMobi PTE LTD., Singapore (SG)

(72) Inventor: Amit Deshpande, Bangalore (IN)

(73) Assignee: InMobi PTE LTD., Singapore (SG)

( * ) Notice: Subject to any disclaimer, the term of this patent is extended or adjusted under 35 U.S.C. 154(b) by 0 days.

(21) Appl. No.: 14/823,592

(22) Filed: Aug. 11, 2015

(65) Prior Publication Data

US 2016/0042399 A1    Feb. 11, 2016

(30) Foreign Application Priority Data

Aug. 11, 2014  (IN) .................. IN3929/CHE/2014

(51) Int. Cl.
*G06Q 30/02* (2012.01)

(52) U.S. Cl.
CPC .................. *G06Q 30/0267* (2013.01)

(58) Field of Classification Search
CPC ............ G06Q 30/0267; G06Q 30/0207–0277; H04W 4/50; H04W 4/02; A61B 5/7455; G01D 1/16
See application file for complete search history.

(56) References Cited

U.S. PATENT DOCUMENTS

| | | | | |
|---|---|---|---|---|
| 2012/0089465 A1* | 4/2012 | Froloff | ............... | H04W 4/50 705/14.71 |
| 2012/0310587 A1* | 12/2012 | Tu | ............... | G01D 1/16 702/141 |
| 2013/0151343 A1* | 6/2013 | Phan | ............... | H04W 4/02 705/14.64 |
| 2017/0221349 A1* | 8/2017 | Rausch | ............... | A61B 5/7455 |
| 2018/0218400 A1* | 8/2018 | Kerns | ............... | G06Q 30/0256 |

FOREIGN PATENT DOCUMENTS

CN    102215461 A * 10/2011    ............ G06Q 30/02

OTHER PUBLICATIONS

Valvano & Yerraballi, "Chapter 12: Interrupts Embedded Systems—Shape the World," https://users.ece.utexas.edu/~valvano/Volume1/E-Book/C12_Interrupts.htm (2014) (Year: 2014).*

* cited by examiner

*Primary Examiner* — David J Stoltenberg
*Assistant Examiner* — Michael J Cross

(57) ABSTRACT

A method provides personalized recommendations to a mobile device associated with a user. The method includes obtaining an event log from the one or more sensors embedded in the mobile device associated with the user. The event log is analyzed by a processor of the present invention to identify one or more attributes associated with the surroundings of the mobile device. A method selects one or more recommendations to be sent to the mobile device associated with the user. In additional embodiments, methods record the response received to the recommendations and using the recorded responses to further select more personalized recommendations.

20 Claims, 4 Drawing Sheets

SYSTEM AND METHODS FOR PROVIDING RECOMMENDATIONS

FIELD OF THE INVENTION

The present invention relates to providing recommendations to a user. In particular, the invention relates to providing personalized recommendation to a user based on the surroundings of the user.

BACKGROUND

The prior art is replete with different content delivery methods and systems winch push content to the mobile users or deliver content as requested by the mobile user. Mobile devices include mobile or cellular phones, smart phones, personal digital assistants ("PDAs"), supporting mobile connectivity, palmtop computers supporting mobile connectivity, laptop mobile, computers supporting mobile connectivity, and the like. These mobile devices function as wireless communication devices via a wireless communication link (GSM, GRPS, 3G, CDMA and the like) and access content over the wireless network infrastructure setup by the Mobile Network Operators like Cingular and Verizon Wireless in the USA, Airtel and Hutch in India.

Traditional content delivery systems push content to the mobile users as per user's requests or otherwise spamming the user with irrelevant content. For example, a user interested in sports may be sent content related to movies as part of advertising. This might not be acceptable to the user. In this example based on traditional content delivery systems, it is impossible for the content solutions providers and advertisers to reach the intended target audience with the right personalized content as per users liking. On the other hand, the user is irritated by irrelevant content and may resort to blocking access by the content providers. Also, few content delivery systems provide some personalization and these systems requires frequent interactions with the mobile user and requires the mobile user to explicitly rate content and/or recommendations delivered to the mobile device, which turns out to be a cumbersome process if the mobile user has to rate various content items. With the gamut of content options available to the mobile users, this turns out to be a constantly nagging problem for the mobile user to rate every content item received or content recommendation received, so as to improve the accuracy of the type of content items received in future.

In light of the above discussion, there exists a need for a method and a system to provide personalized recommendations to a user without interfering with user privacy.

SUMMARY

A method for providing personalized recommendations to a mobile device associated with a user. The method includes obtaining at least an event log from the sensors embedded in the mobile device associated with the user. In an embodiment, the event logs are obtained at predetermined intervals of time. The event log is analyzed, by a processor, to determine one or more attributes related to the surroundings of the mobile device of the user. The method further includes selecting one or more recommendations from a database of recommendations to be sent to the mobile device associated with the user. The one or more recommendations are sent to the mobile device of the user for displaying in a pre-determined layout.

In an embodiment, the event log comprises data measured by one or more sensors embedded on the mobile device, the data corresponding to one of light conditions around the mobile device, sound level around the mobile device, speed of the moving mobile device, vital body parameters of the mobile device, and position of the mobile device of the user. In another embodiment, the selecting of the set of recommendations is done based on historical data associated with the surroundings of the user. In yet another embodiment, the obtaining of the event log is performed through a software development kit installed in the mobile device associated with the user.

In another aspect, the invention provides a system for providing personalized recommendations to a mobile device associated with a user. The system includes a data obtainment module configured to obtain one or more event logs from the mobile device associated the user. The system further includes a processor configured to analyze the one or more event logs to gather information about one or more attributes associated with the surroundings of the mobile device. Further, the system includes a selection module configured to select one or more recommendations corresponding to the one or more retrieved attributes. The system further comprises a transmitter configured to transmit the one or more recommendations to the mobile device for displaying in a pre-determined layout.

In an embodiment, the data capturing module is a software development kit installed in the mobile device associated with the user. In another embodiment, the selection module is configured to select the one or more recommendations from the database based on historical data associated with the surroundings of the user. In yet another embodiment, the obtained data comprises light conditions around the user, sound level Around the user, speed of the moving user, vital body parameters of the user, and position of the mobile device of the user and the like. In yet another embodiment, obtaining of data is done using sensors present on the mobile device associated with the user.

DETAILED DESCRIPTION OF THE INVENTION

In the following detailed description, reference is made to the accompanying drawings that form a part hereof and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
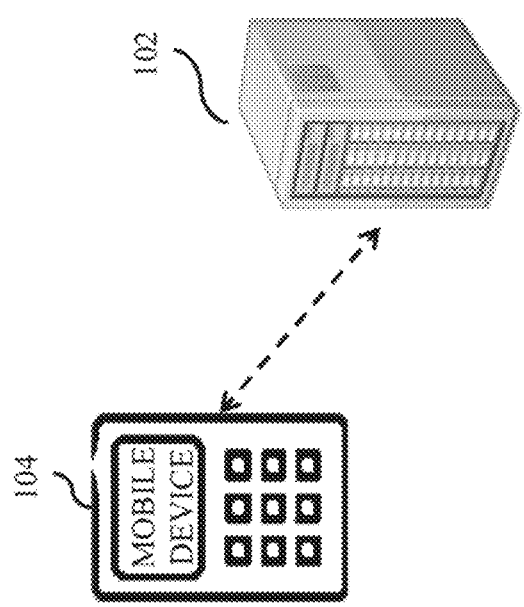
FIG. 1 illustrates a system for providing personalized recommendations to a mobile device associated with a user, in accordance with embodiments of the present invention.

FIG. 1 illustrates a system 100 for providing personalized recommendations to a mobile device associated with a user, hereinafter referred to as the mobile device, in accordance with embodiments of the present invention. The system 100 includes an application server 102. The application server 102 performs various operations. The application server 102 maintains logs relating to the operations performed.

In an embodiment, the application server 102 is an advertisement server, which maintains the record of the click through rates of a particular advertisement served to the plurality of websites. In yet another embodiment, the application server 102 is a sensor management server, which maintains a record of various sensor activities of a plurality of mobile devices.

The application server 102 collects data from the mobile device 104. Although the system 100 depicts only one mobile device, a person skilled in the art will be able to appreciate that, the system is applicable to a plurality of mobile devices. The mobile device 104 includes a plurality of sensors and a plurality of applications installed. Each of the plurality of application triggers an interrupt from at least one of the sensors. In an embodiment, the application server 102 collects the sensor data from the mobile device 104 using a software development kit (hereinafter referred to as SDK) installed in the mobile device 104.

Figure 2:
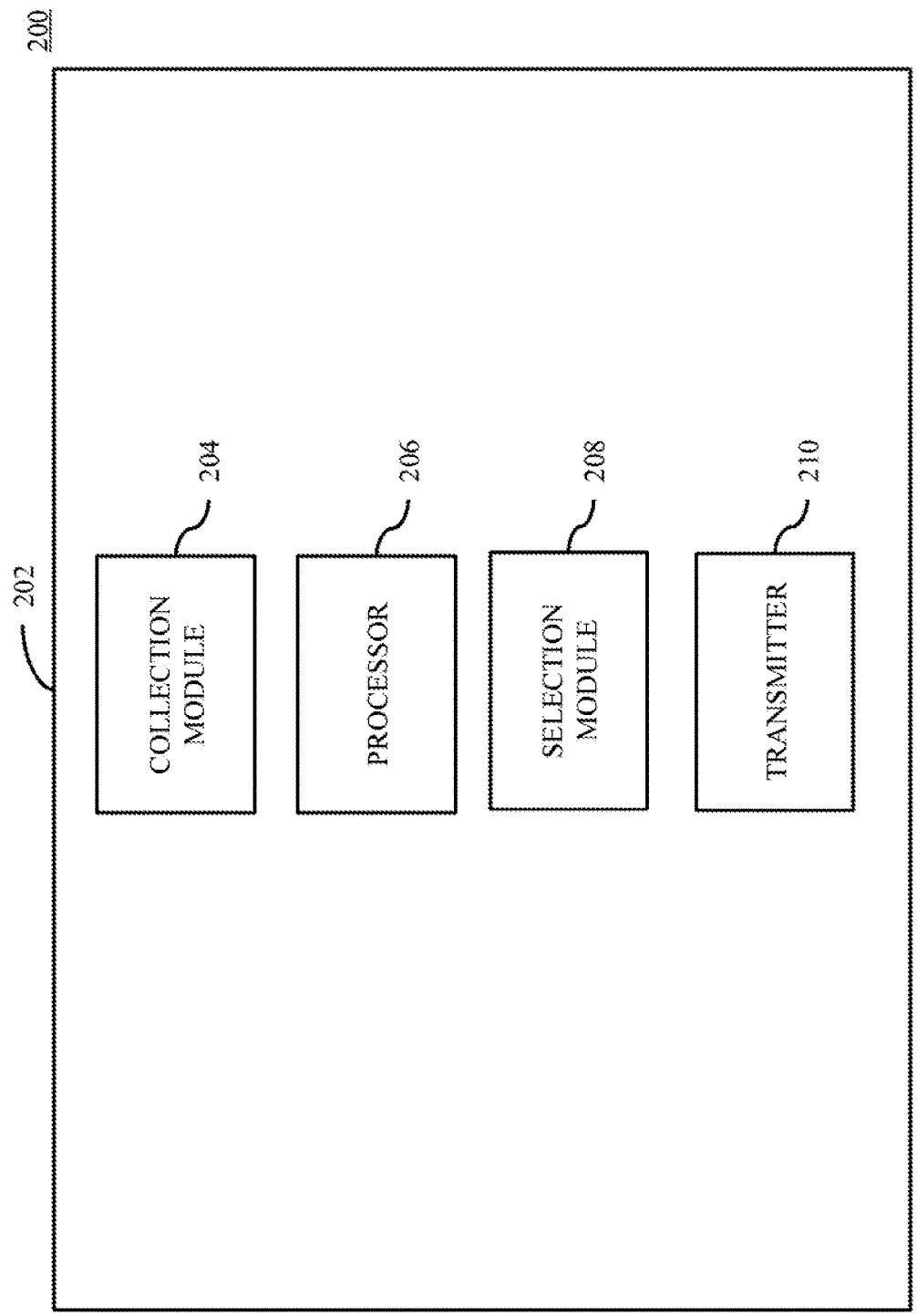
FIG. 2 illustrates a block diagram of an personalized recommendation system for providing personalized recommendations to a mobile device associated with a user, in accordance with embodiments of the present invention.

FIG. 2 illustrates a block diagram of a recommendation system 200 for providing personalized recommendations to the mobile device 104, in accordance with embodiments of the present invention. The recommendation system 200 includes an application server 202. The functions and capabilities of the application server 202 are the same as the functions and capabilities of the application server 102. The application server 202 includes a collection module 204. The collection module 204 collects data from the mobile device 104. In an embodiment, the collection module 204 is coupled to the SDK installed in the mobile device 104. The mobile device 104 includes multiple sensors, multiple applications and at least an SDK. The SDK in the mobile device 104 monitors the activities of the multiple sensors. The sensors generate interrupts when they are activated.

In an embodiment, at least one of multiple the sensors embedded in the mobile device 104 generate interrupts when at least one of the multiple applications is run by the mobile device 104. The one or more physical or physiological data detected by the sensors are stored in the event logs along with other parameters associated with the mobile device, such as, time of detection, location, IP address and the like. The one or more sensors may include an accelerometer, a GPS sensor, an ambient light sensor, a proximity sensor, a gyroscope and the like. In an embodiment, the collection module 204 captures event logs from each of the one or more sensors at pre-determined intervals. In an embodiment, the collection module 204 also collects data from the sensors without the generation of an interrupt. Examples of data collected by the collection module 204 without generating interrupts include but are not limited to light conditions around the user, sound level around the user, speed of the moving user, vital body parameters of the user, position of the mobile device of the user and the like.

The SDK in the mobile device 104 collects the data related to the above mentioned activities of the sensors. The data obtainment module 204 coupled to the SDK collects the event logs from the SDK.

The collection module 204 is coupled to a processor 206. The components, structure, working principle of the processor 206 is the same as that of any processor well known in the art. The processor 206 also includes a variety of computer system readable media. Such media is any available media that is accessible by the application server 202, and includes both volatile and nonvolatile media, removable and non-removable media. In an embodiment, the processor is a worker computer node. In an embodiment, the collection module 204 is configured to collect the event logs from the one or more sensors at pre-determined internals.

In an embodiment, the system memory includes computer system readable media in the form of volatile memory, such as random access memory (RAM) and cache memory. The processor 206 further includes other removable and non-removable, nonvolatile computer system storage media.

The processor 206 is configured to analyze the event log collected by the collection module 204 in order to determine one or more attributes associated with the surroundings of the mobile device. Examples of the attributes include but are not limited to weather, music preferences, temperature, level of activity and the like. In an embodiment, based on the light conditions around the user, the processor 206 determines the time of the day. In another embodiment, based on the speed of the moving user the processor 206 determines the activity being performed by the user.

The processor 206 is communicatively coupled to a selection module 208. The selection module 208 comprises a database of one or more sets of recommendations. In one embodiment, these embodiments are pre-defined and stored in the database corresponding to various attributes determined by the processor 206. In another embodiment, the selection module 208 is configured to generate recommendations by combining one or more parameters associated with the mobile device and the one or more attributes determined by the processor 206. For example, if the processor 206 determines the brightness in the surroundings to be below normal or ambient light and further if the data collection module 204 provides information on one or more parameter such as location of the mobile device, the selection module 208 is configured to combine these two attributes and select recommendations for the restaurants in the proximity. In an embodiment, the selection module 208 selects the set of personalized recommendations when triggered by an event that the system detects upon analyzing the surroundings data. In another example, upon detecting that the user is engaging in a morning jog, the selection module 208 selects a set of personalized recommendations of health tips.

The selection module 208 is coupled to a transmitter 210. The transmitter 210 is configured to send the one or more recommendations selected by the selection module 208 to the mobile device 104 for displaying in a pre-determined layout. The one or more recommendations are one or more forms of banners, interstitial content, video content, animations, sounds, text messages, IMs and the like. Accordingly, the one or more recommendations are transmitted to the mobile device in the layout corresponding to the type of recommendation.

In one embodiment of the present invention, the selection module 208 is further configured to receive user response to the one or more recommendations displayed on the mobile device 104. The selection module 208 is further configured to record the user response in the database.

In yet another embodiment, the selection module 208 is configured to select a set of recommendations for transmitting to the mobile device. The set of recommendations is selected upon determining a threshold of repetitive attributes determined by the processor 206. For example, upon detecting that the user is engaging in a morning jog, a set of personalized recommendations of health tips is selected to be transmitted to the mobile device 104 at pre-determined intervals.

Figure 3:
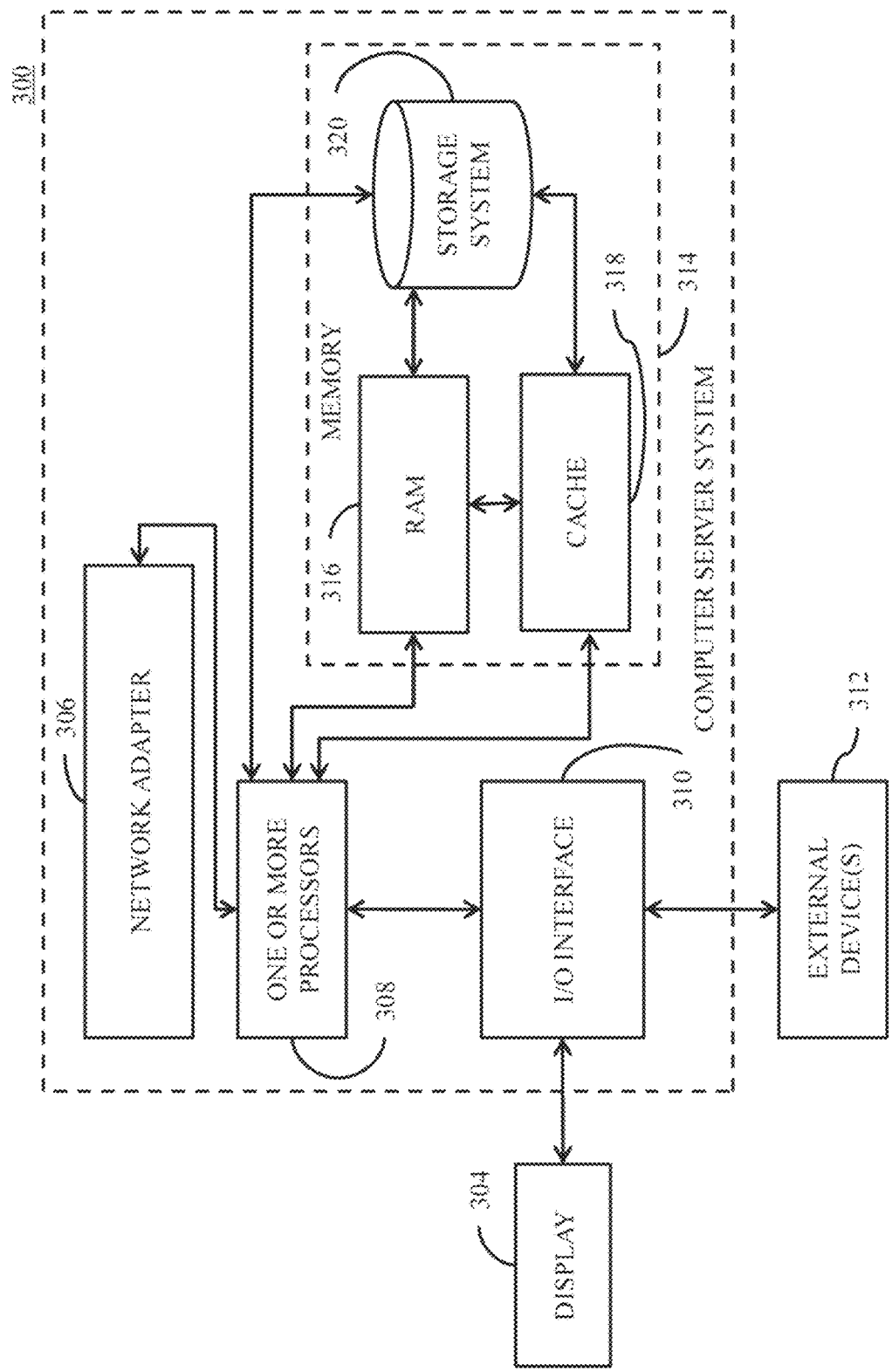
FIG. 3 illustrates a block diagram of a processor, in accordance with various embodiments of the present invention.

FIG. 3 illustrates a block diagram of a processor 300 as a worker computer node, in accordance with various embodiments of the present invention. The functions and capabilities of the worker computer node 300 are the same as the functions and capabilities of the processor 206. The computer server 302 in the worker computer node 300 is shown in the form of a general-purpose computing device. The components of computer server 302 include but are not limited to one or more processors 308, a system memory 314, a network adapter 306, an input-output (I/O) interface 310 and one or more buses that couple various system components to the one or more processors 308.

The one or more bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer server 302 typically includes a variety of computer system readable media. Such media is any available media that is accessible by computer server 302, and includes both volatile and nonvolatile media, removable and non-removable media. In an embodiment, the system memory 314 includes computer system readable media in the form of volatile memory, such as random access memory (RAM) 316 and cache memory 318. Computer server 302 further includes other removable/non-removable, nonvolatile computer system storage media. In an embodiment, the system memory 314 includes a storage system 320.

Computer server 302 can communicate with one or more external devices 312 and a display 304, via input-output (I/O) interfaces 310. In addition, computer server 312 can communicate with one or more networks such as a local area network (LAN), a general wide area network (WAN), and/or a public network (for example, the Internet) via the network adapter 306.

It can be understood by one skilled in the art that although not shown, other hardware and/or software components can be used in conjunction with the computer server 302. Examples, include, but are not limited to microcode, device drivers, redundant processing units, external disk drive arrays, RAID systems, tape drives, and data archival storage systems, and the like.

Figure 4:
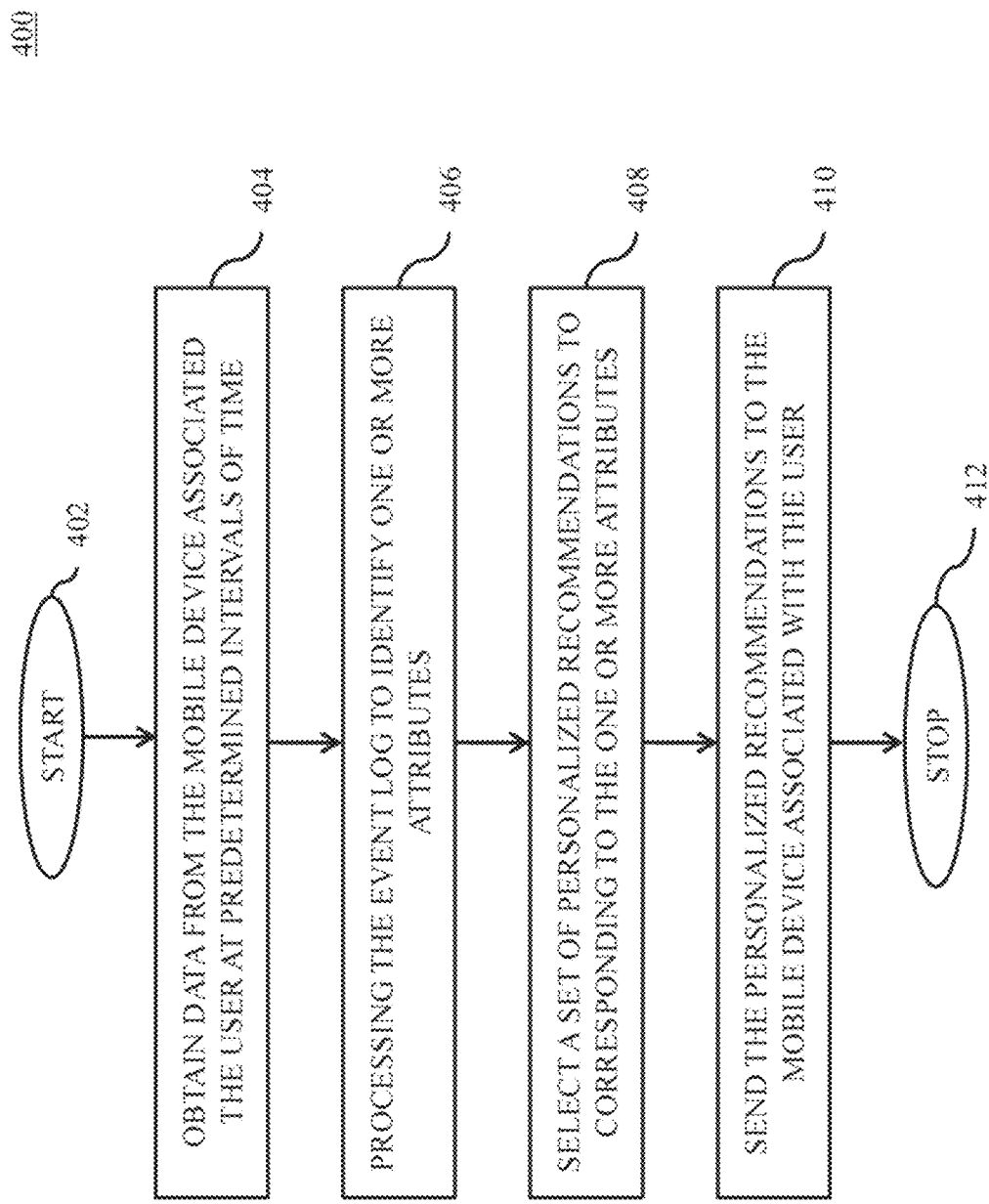
FIG. 4 illustrates a flowchart for providing personalized recommendations to a mobile device associated with a user, in accordance with embodiments of the present invention.

FIG. 4 illustrates a flowchart 400 for providing personalized recommendations to a mobile device associated with a user, in accordance with embodiments of the present invention. The flowchart 400 initiates at step 402. At step 404, data associated with at least one of the multiple sensors in the mobile device 104 is collected and stored as event log. The data collected is based on interrupts generated by at least one of the multiple sensors are activated. In an embodiment, at least one of multiple the sensors generate interrupts when at least one of the multiple applications is run by the mobile device 104. In another embodiment, at least one of the multiple sensors generates interrupts at predetermined intervals of time based on various attributes of the mobile device 104. In an embodiment, the data is collected from the sensors without the generation of an interrupt. Examples of data collected by the data obtainment module without generating interrupts include but are not limited to light conditions around the user, sound level around the user, speed of the moving user, vital body parameters of the user, position of the mobile device of the user and the like.

At step 406, the event logs are analyzed by the processor 206. The event logs are analyzed to identify one or more attributes associated with the surroundings of the mobile device. Examples of the attributes include but are not limited to weather, music preferences, temperature, level of activity and the like. At step 406, the processor 206 also determines attributes related to the surroundings of a user based on the data collected by the collection module 204. In an embodiment, based on the light conditions around the user, the processor 206 determines the time of the day. In another embodiment, based on the speed of the moving user the processor 206 determines the activity being performed by the user.

At step 408, one or more recommendations to be sent to the mobile device are selected. The one or more recommendations are selected corresponding to the one or more attributes associated with the surroundings of the mobile device. For example, upon detecting that the user is engaging in a morning jog, one or more health tips are selected from the database for displaying on the mobile device 104. In another embodiment, upon detecting that the user is engaging in a morning jog, the one or more recommendations may comprise an advertisement for jogging shoes and the like.

At step 410, one or more recommendations selected in the step 408 is sent to the mobile device 104 for displaying in a pre-determined layout. In one embodiment, the pre-determined layout is one of a browser, a banner in an application and the like. In yet another embodiment, the recommendations are displayed as a text message, an audio message, a video clip and the like. The flowchart terminates at step 412.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for utilizing sensors and interrupt technology to control a mobile device for providing recommendations to the mobile device associated with a user, the method comprising:

executing instructions stored in memory by a processor of a mobile device to cause an application computer server system to:
collect event log data representing detection of physical environment event data of the mobile device and physiological event data of a user of the mobile device with sensors embedded on the mobile device associated with the user in response to an interrupt triggered by the sensors:
(i) when the sensors are activated; and
(ii) at first predetermined intervals;
wherein:
the interrupt and the first predetermined intervals cause one or more applications on the mobile device to obtain an event log that includes the physical environment and physiological event data from two or more of the sensors; and the data representing the physical environment data is independent of the physiological event data;

analyze the event log to identify one or more attributes associated with surroundings of the mobile device associated with the user;

select one or more recommendations from among a set of recommendations corresponding to the one or more attributes;

send the one or more recommendations to the mobile device at second predetermined intervals to cause the mobile device to display the recommendations in a pre-determined layout on the mobile device associated with the user.

2. The method as claimed in claim 1, wherein the event log comprises at least the data corresponding to light conditions around the user, sound level around the user, speed of the moving user, vital body parameters of the user, and position of the mobile device of the user.

3. The method as claimed in claim 1 further executing the instructions stored in memory by the processor of the computer system to cause the computer system to: display a set of recommendations corresponding to a combination of one or more attributes associated with surroundings of the mobile device associated with the user.

4. The method as claimed in claim 1, wherein to obtain the event log further comprises to obtain the event log from the one or more sensors occurs at pre-determined intervals.

5. The method as claimed in claim 1, further executing the instructions stored n memory by the processor of the computer system to cause the computer system to: store the response received from the mobile device associated with the user after displaying the one or more recommendations.

6. The method as claimed in claim 1, wherein to obtain the event log performed through a software development kit installed in the mobile device associated with the user.

7. A system for utilizing sensors and interrupt technology to control a mobile device for providing recommendations to a mobile device associated with a user, wherein applications executing on the mobile device are coupled to sensors embedded in the mobile device to detect physical environment event data of the mobile device and physiological event data of a user of the mobile device and store the event data in an event log, wherein the sensors are further configured to generate an interrupt of the applications, the system comprising:

a collection module, in response to each interrupt generated when the sensors are activated and each interrupt generated by the sensors at first predetermined intervals, to obtain the event log that includes the physical environment and physiological event data from two or more of the sensors embedded in the mobile device associated the user, wherein the data representing the physical environment data is independent of the physiological event data;

a processor configured to analyze the event log, wherein the analyzing is done to identify one or more attributes associated with surroundings of the mobile device associated with the user;

a selection module to select one or more recommendations from among a set of recommendations corresponding to the one or more attributes; and a transmitter configured to send the recommendations at second predetermined intervals to the mobile device associated with the user for displaying in a pre-determined layout.

8. The system as claimed in claim 7, wherein the one or more recommendations are stored in a database, wherein the database is communicatively connected to the selection module.

9. The system as claimed in claim 7, wherein the selection module is further configured to select one or more recommendations based on historical data associated with the surroundings of the user.

10. The system as claimed in claim 7, wherein the selection module is configured to transmit a set of recommendations to the mobile device upon detecting periodicity in the attributes monitored.

11. The method as claimed in claim 2, wherein the sensors include an accelerometer, a global positioning sensor, an ambient light sensor, a proximity sensor, and gyroscope, and the sensors sense body parameters of the user of the mobile device and at least one of light conditions around the mobile device, sound level around the mobile device, speed of the moving mobile device, and position of the mobile device of the user.

12. The method as claimed in claim 1, wherein to select one or more recommendations further comprises to select from among the set of recommendations based on historical data associated with the surroundings of use of the mobile device.

13. The system as claimed in claim 7, wherein the event log comprises at least the data corresponding to light conditions around the user, sound level around the user, speed of the moving user, vital body parameters of the user, and position of the mobile device of the user.

14. The system as claimed in claim 13, wherein the sensors include an accelerometer, a global positioning sensor, an ambient light sensor, a proximity sensor, and gyroscope, and the sensors sense body parameters of the user of the mobile device and at least one of light conditions around the mobile device, sound level around the mobile device, speed of the moving mobile device, and position of the mobile device of the user.

15. The system as claimed in claim 7 further comprising a display to display a set of recommendations corresponding to a combination of one or more attributes associated with surroundings of the mobile device associated with the user.

16. The system as claimed in claim 7, wherein to obtain the event log further comprises to obtain the event log from the one or more sensors occurs at pre-determined intervals.

17. The system as claimed in claim 7 further including a storage module to store the response received from the mobile device associated with the user after displaying the one or more recommendations.

18. The system as claimed in claim 7, wherein to obtain the event log is performed through a software development kit installed in the mobile device associated with the user.

19. The system as claimed in claim 7, wherein to select one or more recommendations further comprises to select from among the set of recommendations based on historical data associated with the surroundings of use of the mobile device.

20. A non-transitory, computer readable medium comprising instructions stored therein that are executable by a processor of an application computer server system for utilizing sensors and interrupt technology to control a mobile device for providing recommendations to the mobile device associated with a user and causing the processor to:

collect event log data representing detection of physical environment event data of the mobile device and physiological event data of a user of the mobile device with sensors embedded on the mobile device associated with the user in response to an interrupt triggered by the sensors:
  (i) when the sensors are activated; and
  (ii) at first predetermined intervals;
  wherein:
    the interrupt and the first predetermined intervals cause one or more applications on the mobile device to obtain an event log that includes the physical environment and physiological event data from two or more of the sensors; and
    the data representing the physical environment data is independent of the physiological event data;
analyze the event log to identify one or more attributes associated with surroundings of the mobile device associated with the user;
select one or more recommendations from among a set of recommendations corresponding to the one or more attributes; and
send the one or more recommendations to the mobile device at second predetermined intervals to cause the mobile device to display the recommendations in a pre-determined layout on the mobile device associated with the user.

* * * * *